United States Patent Office 3,773,740
Patented Nov. 20, 1973

3,773,740
DEVOLATILIZATION METHOD
Ted T. Szabo, Martinsville, N.J., assignor to Union
Carbide Corporation, New York, N.Y.
Continuation-in-part of application Ser. No. 30,946, Apr. 22, 1970, which is a continuation-in-part of application Ser. No. 693,083, Dec. 26, 1967, both now abandoned. This application Oct. 21, 1971, Ser. No. 191,425
Int. Cl. C08f 7/04
U.S. Cl. 260—93.5 A    4 Claims

ABSTRACT OF THE DISCLOSURE

A method is disclosed for enhancing the efficiency of separating volatiles from a viscous polymeric solution containing a polymer of styrene and volatile aromatic solvent comprising injecting water as a devolatilization aid into said polymeric styrene solution in an injection zone in an amount greater than 0.50 to about 2.75 weight percent (based on said styrene polymer), introducing the devolatilization aid-containing polymeric styrene solution into a devolatilization zone maintained at a pressure lower than that of said injection zone and at a temperature above the boiling point of said viscous polymeric styrene solution at such lower pressure to volatilize such volatile solvent and devolatilization aid, separating said volatilized constituents from said devolatilization zone to provide devolatilized styrene polymer, and removing the devolatilized styrene polymer from said devolatilization zone.

---

This application is a continuation-in-part of application Ser. No. 30,946, filed Apr. 22, 1970 which is, in turn, a continuation-in-part of application Ser. No. 693,083, filed Dec. 26, 1967 and both now abandoned.

The present invention relates to a method for separating volatiles from viscous styrene polymer solutions, particularly to a method for improving the efficiency of the devolatilization of such solutions.

In the preparation of styrene polymers, as in bulk and solution polymerization or by other conventional methods, considerable amounts of starting materials, such as unreacted monomer or solvent remain admixed or entrained in the polymer product. This contamination of polymer is undesirable because of adverse effects on polymer properties, as is well known in the art. A common method of separating the polymer from such fluid compositions is devolatilization. The composition is heated and introduced into a low pressure chamber to flash vaporize solvent and other volatiles causing foaming of the composition. However, a shortcoming of this method is that the foaming is less thorough than desirable and some of the volatiles are entrapped in the foam and remain with the product, so that further processing, including subjecting the product to mechanical shear is required to reduce the impurities to an acceptable level, i.e. to produce a styrene polymer product of 98% solids or higher. The higher the percent solids content of the starting solution, the more difficult it becomes to devolatilize the remaining volatile constituents. A method for improving the devolatilization efficiency of such viscous styrene polymer solutions, particularly those solutions of high (over 95%) solids content, has heretofore not been available.

A method has now been discovered for enhancing the devolatilization of viscous styrene polymer solutions.

Figure 1:
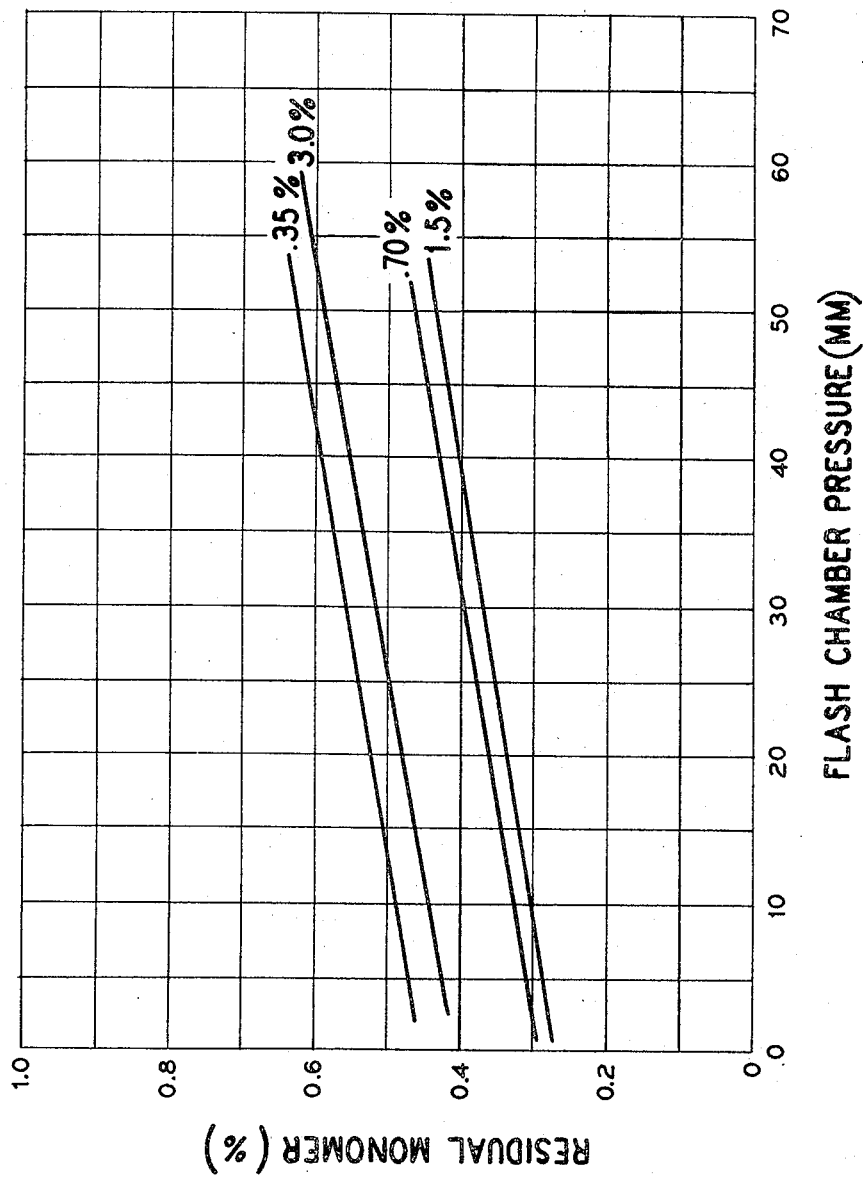
Figure 2:
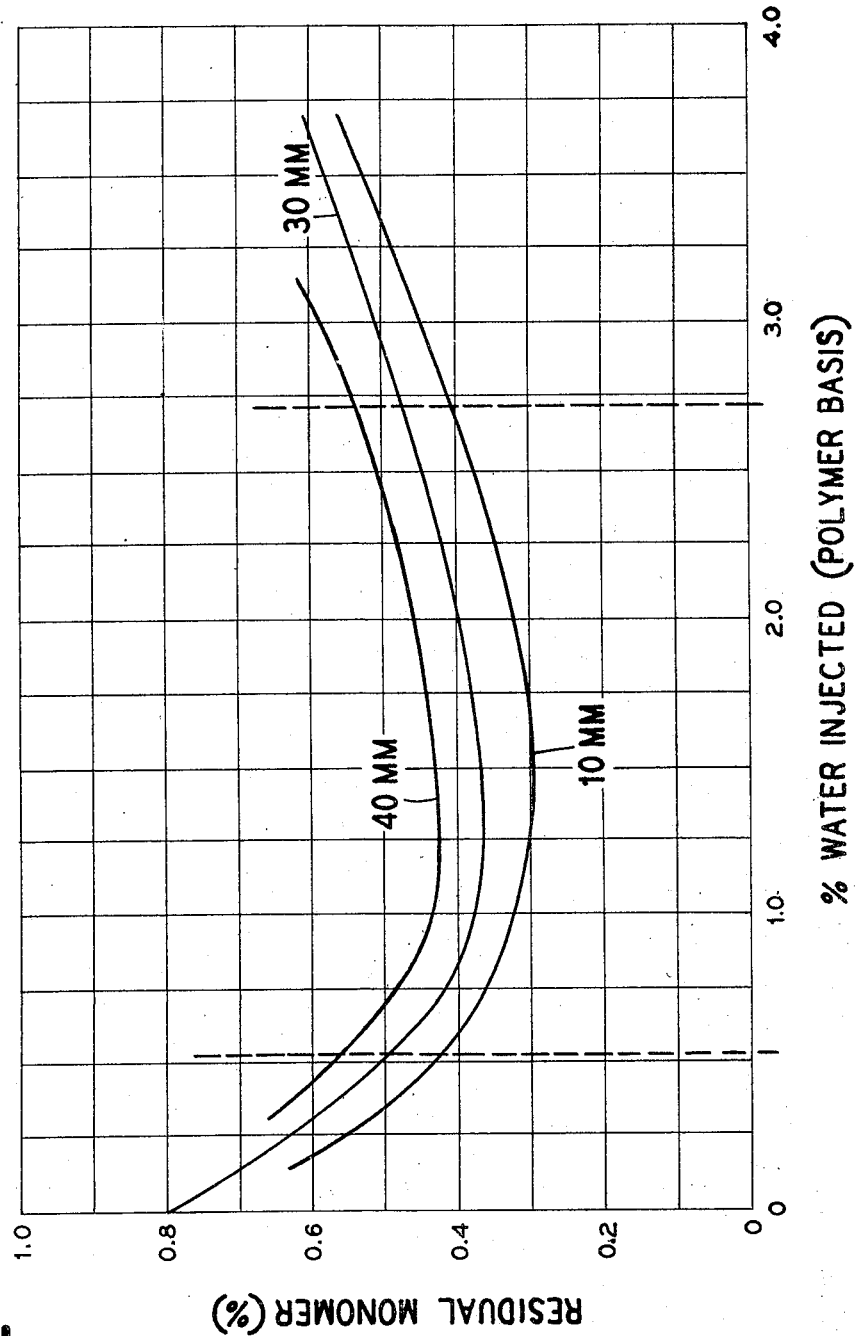

The invention will be described in connection with the accompanying drawings, wherein:

FIG. 1 is a graph showing the percentage of residual monomer in styrene polymer solution as a function of flash devolatilization chamber pressure within various parameters of the invention; and FIG. 2 is a graph showing the percentage of residual monomer in styrene polymer solution for various devolatilization chamber pressures as a function of parameter variations in accordance with the invention.

As employed herein, the term "viscous polymeric styrene solution" means a viscous solution containing high percentages of styrene polymer in a selected seven and/or eight carbon aromatic solvent.

As employed herein, the term "styrene polymer" includes homopolymers of styrene as well as copolymers of styrene with other co-monomers (such as acrylonitrile, butadiene, and the like), all of which are well known in the styrene polymerization art. Such homopolymers, copolymers and terpolymers (such as, for example, acrylonitrile-butadiene-styrene terpolymer) have long been known to present substantially the same problems in solvent removal from solutions thereof.

The solvents employed are conventional in the styrene polymerization art and are herein understood to be at least one member selected from the group consisting of monomeric styrene, ethylbenzene, the xylenes (i.e., o-xylene, m-xylene, p-xylene) and toluene. All such seven and eight carbon aromatics have reasonably close physical characteristics (e.g. boiling point and density) and similar thermodynamic characteristics. A typical viscous polymeric styrene solution would comprise of the order of 90 percent polystyrene in 10 percent of one or a mixture of such aromatic solvent(s).

The objective to which the method of the present invention is directed is to reduce solvent content of such viscous polymeric styrene solutions by devolatilization. Viewed conversely, the objective of the present invention is to increase the concentration of such starting solutions to polymeric styrene contents of at least 98 percent and preferably 99 percent or higher.

In accordance with the present invention, a method is provided for separating volatiles from viscous polymeric solutions containing styrene polymer and volatile aromatic solvent comprising injecting water as a devolatilization aid into said polymeric styrene solution in an injection zone in an amount greater than 0.50 to about 2.75 weight percent (based on said styrene polymer), introducing the devolatilization aid-containing polymeric styrene solution into a devolatilization zone maintained at a pressure lower than that of said injection zone and at a temperature above the boiling point of said viscous polymeric styrene solution at such lower pressure to volatilize such volatile solvent and devolatilization aid, separating said volatilized constituents from said devolatilization zone to provide devolatilized polymeric styrene, and removing the devolatilized styrene polymer from said devolatilization zone.

Thus, water is added to the polymeric styrene solution as a devolatilization aid which enhances foamability at a given temperature when the pressure is reduced and increases the efficiency of devolatilization by obtaining the largest possible liquid vapor interface. Starting solutions having high solids content, e.g. 95.0% solids or more, are readily devolatilized to even higher solids content, e.g. 99.0% solids or more.

Specifically, it has been recognized that an unexpected enhancement in the devolatilization efficiency of viscous polymeric styrene solutions can be realized by injecting water as a devolatilization aid into the solution within a narrow concentration range before the solution is devolatilized.

By the method of this invention, the polymeric styrene solution being processed is rendered foamable or is foamed more thoroughly when subsequently devolatilized. The effect of water acting as a devolatilization aid in the process of the invention is two-fold. First, it enhances foaming of the solution being processed to provide a more open cell structure of very large surface area to permit the volatile impurities ready escape. In addition, the aid acts as a partial pressure depressant, lowering the partial pressure of the volatiles, thereby permitting freer escape, i.e. giving a higher driving force to volatiles, such as solvent, within the foamed solution. The partial pressure of the solvent can thus be lowered to 0.1 mm. or lower, enabling ready removal of solvent particularly from polymeric styrene solutions of high solids content, e.g. 98% solids, where solvent removal becomes increasingly difficult.

To initiate or enhance the foaming action, water is injected as a devolatilization aid into the solution, preferably under pressure. The solution is then mixed and, if necessary, further heated and fed into a devolatilization zone, maintained at a relatively lower pressure, where foaming and evaporation of the volatiles takes place. The devolatilization zone can be of any type known to the art, such as are disclosed in prior U.S. Pats. 3,395,746 and 3,451,462. Additionally, the devolatilization zone may have one or more gears or screws therein to mechanically shear and compress the devolatilized styrene polymer before pumping it out of the zone.

Although the method of this invention is suitable for enhancing the devolatilization of various concentrations of various polymeric styrene solutions, it is particularly suitable for such solutions having 95% by weight or more of styrene polymer therein. For concentrated polymeric styrene solutions having 98% by weight or more of polymer therein, the process of the invention is especially preferred. The above percentages are exclusive of the amount of water added as devolatilization aid.

It has been discovered that the percentage (polymer basis) of water injected into the polymeric styrene solution has a very critical and heretofore unpredicted effect on the percentage of volatiles retained in the styrene polymer after subsequent flash devolatilization. This effect may be seen from a study of the relationship between the percentage of volatiles left in the styrene polymer after flash devolatilization as a function of flash devolatilization chamber pressure for varying percentages of water injection as a devolatilization aid. FIG. 1 of the drawings shows this relationship for varying percentages (polymer basis) of water injection as a devolatilization aid. As there shown, curves are set forth for the injection of between 0.35 percent and 3.0 percent water as a devolatilization aid into polystyrene under varying flash devolatilization chamber pressures. A specific study of the effect on residual monomer indicates that the poorest residual monomer results are obtained with 0.35 percent water injection, while the best residual monomer results are obtained for 1.5 percent water injection over the entire pressure range.

From an analysis of this data, it has been determined that an unexpected optimum in residual monomer obtainable by water injection as a devolatilization aid followed by subsequent flash devolatilization of polystyrene solutions occurs within a narrow range of water injection which is optimized at about 1.5 percent.

Referring specifically to FIG. 2 of the drawings, it will be seen that this conclusion is confirmed for all flash devolatilization chamber pressures shown, the optimum (lowest) residual monomer is obtained with water injection of about 1.5 percent. It is to be noted that, with variation in chamber pressure over the conventional commerical 20–100 mm. Hg range, one will obtain a family of curves for increasing pressure which increase in residual monomer for varying percentage water injection. The optimum unexpected range of water injection producing the lower residual monomer contents, independent of chamber pressure, can be seen to be in a range from about 0.50 to 2.75 percent water injected. For the case of 20 mm. chamber pressure, it can be seen that over this range of water injection the percentage of residual monomer is very desirably below 0.5 percent; and that for the 40 mm. chamber pressure the residual monomer resulting over this range of water injection would be below 0.55 percent.

It is to be noted that, in other tests employing other fluids as devolatilization aids, such unexpected results were not obtained over any significant range and that even with water as the devolatilization aid, these results are only obtained over the specific range of above 0.50 to 2.75 percent.

With water employed as the devolatilization aid, there appear two separated effects on devolatilization depending on whether the water is added in relatively small or large quantities. When little water is added, the benefit is primarily increased foamability of solution, thus creating a large surface exposure. Larger quantities of water on the other hand, exert a steam distillation effect, reduce temperature and slightly (considering the relative amounts used) increase evaporation efficiency.

The fluid polymeric styrene solution is fed to the devolatilization zone at a temperature sufficient to cause vigorous devolatilization thereof when the feed enters the low pressure zone, but below the temperature at which the particular solution components degrade or are otherwise adversely affected. The solution can be maintained at a pressure sufficiently high to prevent boiling in the feed lines by throttle valves, for example, mounted in the lines adjacent to the devolatilization zone or chamber of boiling can occur in the feed lines if desired. Preferably, however, pressure in the feed lines is maintained so that substantial boiling does not occur until the feed solution enters the devolatilization zone. For example, the solution to be concentrated may be heated by mechanical working, e.g. in a twin screw milling apparatus or by passing through a heat exchanger, where it is heated to a boiling temperature and discharged as a foamy mass into the devolatilization zone or chamber, which is usually operated under reduced pressure. The vapors from the incoming solution generated by flashing and foaming of the solvent of the solution and the water devolatilization aid then pass from the zone through the vapor vent.

Although the pressure in the devolatilization zone varies depending upon the particular solvents or other volatiles being vaporized, it has been found that pressures in the range of from 20 to 100 mm. Hg are preferred in commercial practice.

As indicated, a conventional vacuum pump or other suitable evacuating means, connected, for example, to the devolatilization chamber by way of vapor vent, may be conveniently employed. A condenser may be connected to the vapor vent for recovery of the stripped volatiles, if desired.

It is to be noted that the temperature throughout the process of the invention may range typically over between about 175–250° C. For any selected value of operating temperature, there is no substantial variation throughout the process. The material outlet temperatures for the runs which resulted in the curves of FIG. 1 varied from 229–232° C.

The runs listed in the following table were conducted by mixing water as devolatilization aid and polystyrene in a mixing vessel and then pumping the heated composition into a reduced pressure chamber for foaming and devolatilization. The devolatilized polystyrene was discharged at the base of the chamber.

TABLE

| Product | Amount devolatilization aid, weight percent | Temp. feed, °C. | Devolatilization zone pressure, mm. Hg | Percent solids | | Product rate, lbs./hr. |
|---|---|---|---|---|---|---|
| | | | | Feed solution | Product | |
| Polystyrene | 0 | 225 | 24 | 97.10 | 98.50 | 190 |
| Do | 0.9 | 199 | 100 | 99.26 | 99.915 | 315 |
| Do | 1.9 | 187 | 27 | 99.18 | 99.958 | 322 |
| Do | 1.4 | 179 | 26 | 96.20 | 99.924 | 180 |

The improvement in the efficiency in devolatilization of the above polystyrene solutions by the addition of water as devolatilization aid in accordance with the invention is evident from the increase in "percent solids (product)" indicated in the table.

What is claimed is:

1. The method for separating volatiles from viscous polymeric solution containing about 95% or more solid styrene polymer and volatiles including unreacted styrene monomer comprising injecting water as a devolatilization aid into said polymeric styrene solution in an amount greater than 0.50 to about 2.75 weight percent (based on said styrene polymer), introducing the devolatilization aid-containing polymeric styrene solution into a devolatilization zone to volatilize such volatiles and devolatilization aid, separating said volatilized constituents from said devolatilization zone to provide devolatilized styrene polymer, and removing the devolatilized styrene polymer from said devolatilization zone.

2. The method in accordance with claim 1, wherein said injection of water as a devolatilization aid is in an amount of about 1.5 percent (based on said styrene polymer).

3. The method in accordance with claim 1, wherein said injection of water as a devolatilization aid is carried out prior to further heating of said polymeric styrene solution before introduction of said solution into said devolatilization zone.

4. The method in accordance with claim 1 wherein said solid polymer solution is subjected to mechanical shear and compression therein.

References Cited

UNITED STATES PATENTS

| 2,849,430 | 8/1958 | Amos et al. | 260—93.5 A |
| 3,201,365 | 8/1965 | Charlesworth et al. | 260—93.5 A |
| 3,536,787 | 10/1970 | Street | 260—93.5 A |
| 3,684,783 | 8/1972 | Lauck | 260—93.5 A |

HARRY WONG, JR., Primary Examiner

U.S. Cl. X.R.

260—33.6 UA, 80.7, 85.1, 85.5 S